(12) United States Patent
Kojima

(10) Patent No.: US 6,920,139 B2
(45) Date of Patent: Jul. 19, 2005

(54) ATM SWITCH AND METHOD FOR CONTROLLING TRAFFIC SHAPER THEREOF

(75) Inventor: Tomoaki Kojima, Tokyo (JP)

(73) Assignee: NEC Corporation, Tokyo (JP)

( * ) Notice: Subject to any disclaimer, the term of this patent is extended or adjusted under 35 U.S.C. 154(b) by 929 days.

(21) Appl. No.: 09/884,941

(22) Filed: Jun. 21, 2001

(65) Prior Publication Data

US 2004/0202176 A1 Oct. 14, 2004

(30) Foreign Application Priority Data

Jun. 30, 2000 (JP) .................................. 2000/198715

(51) Int. Cl.[7] .................. H04L 12/28; H04L 12/56; H04J 1/16; G08C 15/00; G06F 11/00
(52) U.S. Cl. .................. 370/395; 370/233; 370/412; 709/240
(58) Field of Search .................. 370/230–235, 370/252–254, 363–397, 411–428; 709/238, 240, 249, 250

(56) References Cited

U.S. PATENT DOCUMENTS

| | | | |
|---|---|---|---|
| 5,796,719 A | | 8/1998 | Peris et al. |
| 5,978,356 A | * | 11/1999 | Elwalid et al. ............. 370/230 |
| 6,052,375 A | * | 4/2000 | Bass et al. .................. 370/412 |
| 6,091,708 A | * | 7/2000 | Matsunuma ................ 370/233 |
| 6,154,459 A | * | 11/2000 | Wicklund ................ 370/230.1 |
| 6,198,723 B1 | * | 3/2001 | Parruck et al. .......... 370/230.1 |
| 6,633,540 B1 | * | 10/2003 | Raisanen et al. ........ 370/230.1 |
| 6,704,321 B1 | * | 3/2004 | Kamiya ..................... 370/412 |
| 2003/0007494 A1 | * | 1/2003 | Shahar et al. .......... 370/395.41 |

FOREIGN PATENT DOCUMENTS

| | | |
|---|---|---|
| EP | 0 912 018 A1 | 4/1999 |
| JP | 7-336361 | 12/1995 |
| JP | 8-163145 | 6/1996 |
| JP | 11-136252 | 5/1999 |
| JP | 11-205349 | 7/1999 |
| JP | 11-239158 | 8/1999 |
| JP | 2000-13397 | 1/2000 |

* cited by examiner

Primary Examiner—Man U. Phan
(74) Attorney, Agent, or Firm—McGinn & Gibb, PLLC

(57) ABSTRACT

In an ATM switch, a correspondence between shapers which compose a shaper section and an output circuit(s) is not set up in an initial condition. At the time of a connection set-up, a connection control section interrogates a shaper/circuit control section about a corresponding relationship between the shaper(s) and the output circuit(s). In the case where a shaper(s) corresponding to an assigned circuit number is registered in a shaper/circuit-related table in the shaper/circuit control section, the shaper(s) is chosen. On the other hand, in the case where a shaper(s) is not registered in the table, after a new shaper(s) is registered in the table, a correspondence between the assigned circuit number and the shaper(s) is set up to the shaper section and a circuit interface section, and the corresponding shaper(s) is chosen.

6 Claims, 7 Drawing Sheets

F I G. 2
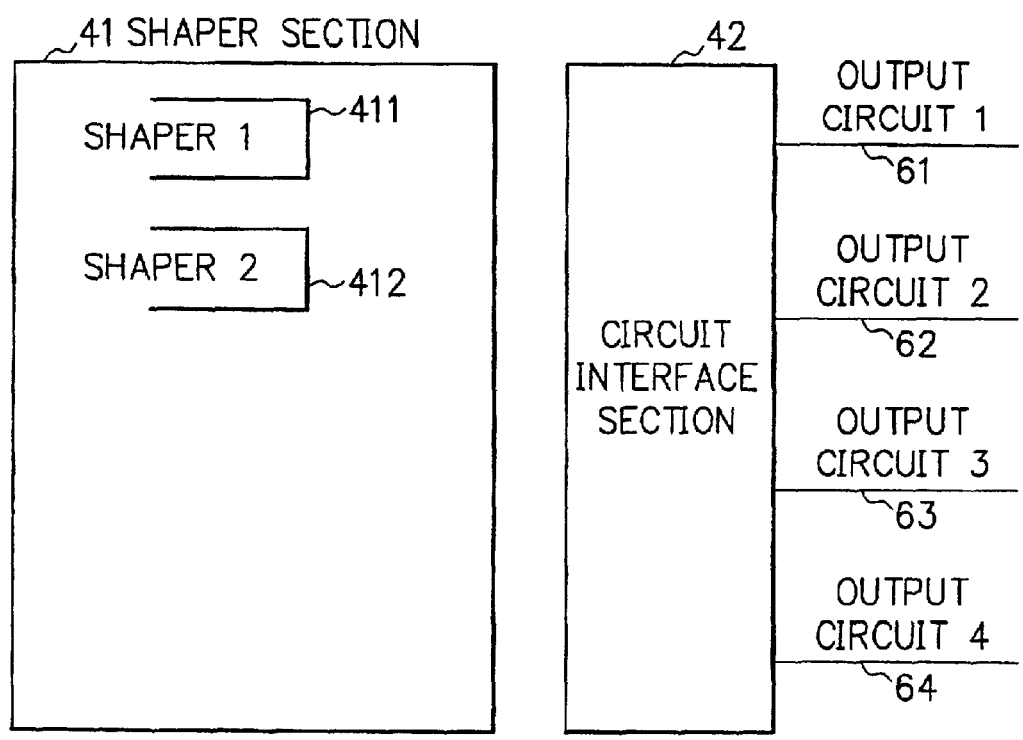

F I G. 4
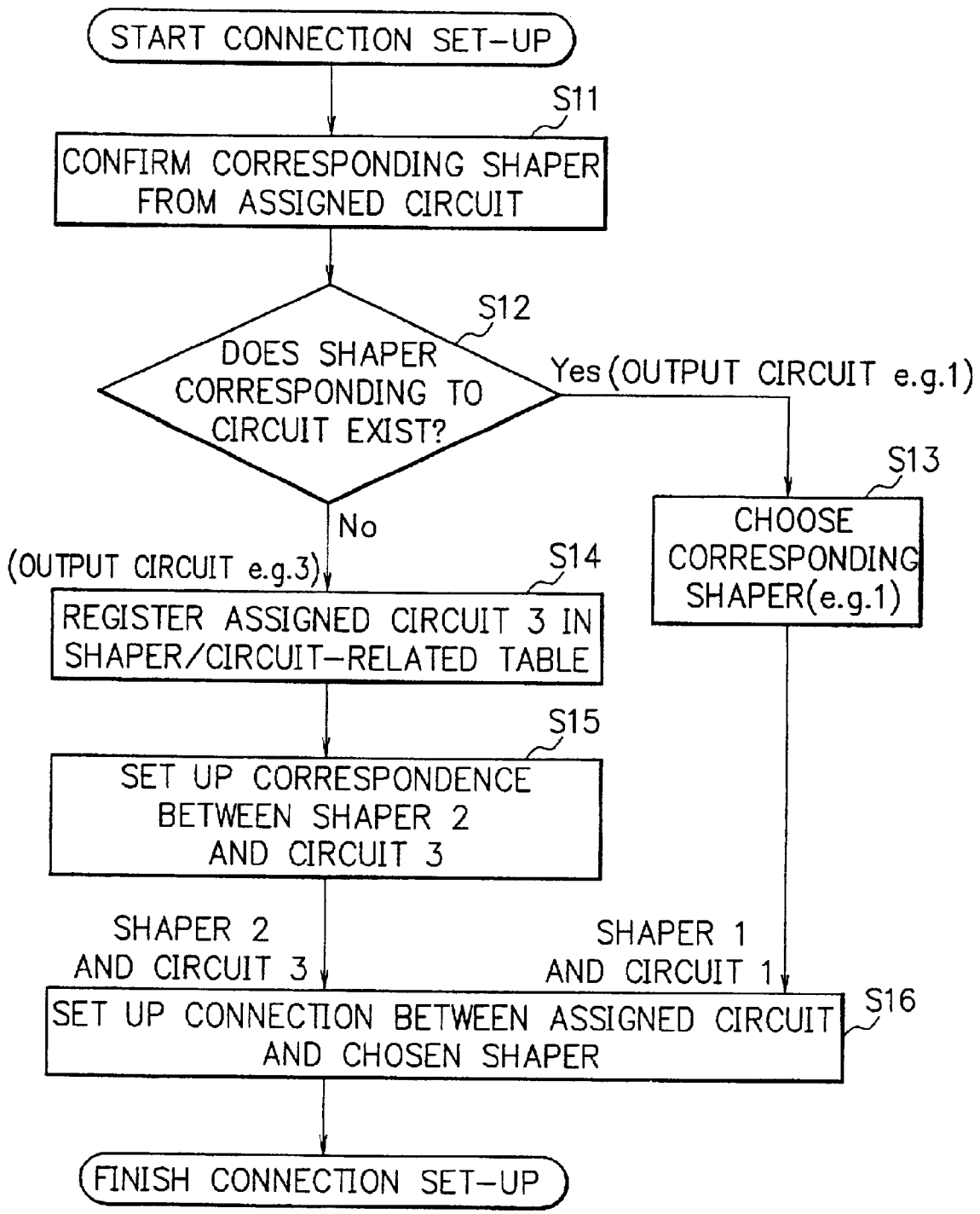

F I G. 7
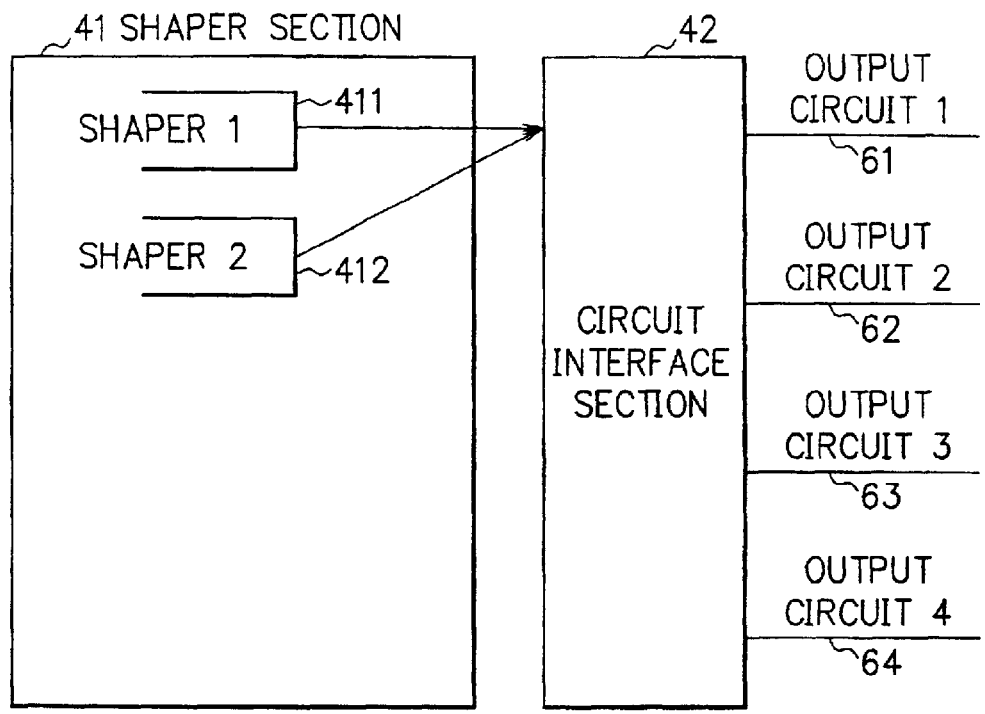
F I G. 8
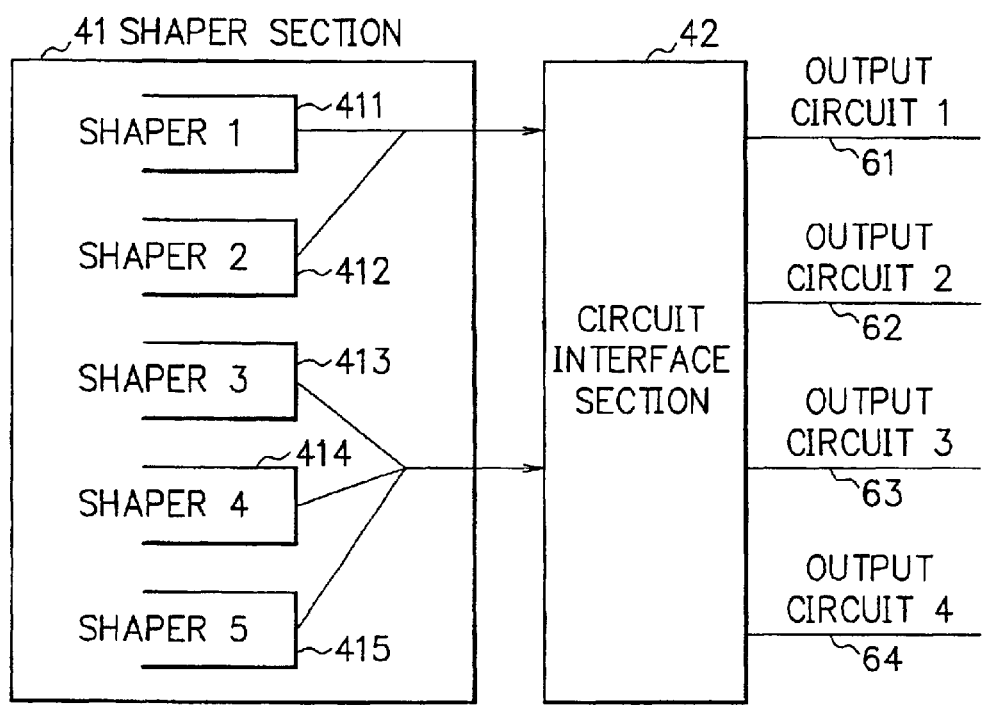

ATM SWITCH AND METHOD FOR CONTROLLING TRAFFIC SHAPER THEREOF

BACKGROUND OF THE INVENTION

The present invention relates to an ATM switch and a method for controlling traffic shapers, and in particular, to an ATM switch having cell traffic shapers in its output circuit module section and a method for controlling traffic shapers thereof.

DESCRIPTION OF THE RELATED ART

An ATM (Asynchronous Transfer Mode) switch has been provided with a shaper in each output circuit (port) or each output circuit and virtual path (VP) in an output circuit module. Shaping is executed to traffic of voice and data that are converted into ATM cells at a shaper, which is chosen at the time of a connection set-up, and the traffic is transferred. In this case, shaping is executed to traffic of each circuit and VP according to the set unit.

That is, in a conventional ATM switch described in the Japanese Patent Application Laid-Open No. 2000-013397, which is provided with a virtual connection shaper and executes VS/VD (Virtual Source/Virtual Destination) control, input cells are discriminated and distributed to each buffer of a priority class, virtual connection/shaping class, and non-priority class, and written in the buffer at a virtual connection (VC) distribution section. After that, the cells are preferentially read in order of the priority class, virtual connection/shaping class, and non-priority class at a control device, so that VC shaping is executed only to a VC to which a shaping is needed by an VC shaper.

Besides, there is disclosed structure of an ATM switch in the Japanese Patent Application Laid-Open No. HEI11-136252. In the case where shaping is executed to each VP, transmission traffic volume of each VC is dynamically changed according to reception traffic volume of the VCs in each of the VPs.

Further, there is shown a shaping method in an ATM switch in the Japanese Patent Application Laid-Open No. HEI8-163145. In this invention, ATM cells outputted from an ATM switch are separated according to each of the output circuits and kinds of traffic, and stored in relevant queues. After that, the ATM cells which are stored in the relevant queues of each of the output circuits and traffic are multiplexed according to traffic patterns corresponding to each of the circuits in prescribed timing, and they are outputted to corresponding circuits.

However, in the conventional ATM switch described in the Japanese Patent Application Laid-Open No. 2000-013397, there is a problem that a circuit shaper and a virtual path (VP) shaper are not considered because this invention is constructed concerning only buffers of the priority class, the virtual connection/shaping class, and non-priority class.

Moreover, the Japanese Patent Application Laid-Open No. HEI11-136252 no discloses correspondence between a circuit shaper and a shaper of each logical channel (VP) because this ATM switch is constructed concerning only plural shapers of each of the circuit shapers and VPs.

Besides, in constitution of the conventional ATM switch described in the Japanese Patent Application Laid-Open No. HEI8-163145, there is no consideration to have plural traffic shapers in each output port because this invention is provided with one traffic shaper in each circuit.

SUMMARY OF THE INVENTION

It is therefore an object of the present invention to provide an ATM switch and a method for controlling traffic shapers, by which it is possible to control traffic shapers and choose a shaper at each time of a connection set-up.

According to the present invention, for achieving the object mentioned above, there is provided an ATM switch wherein plural output circuits are accommodated in an output circuit module section which includes a shaper section and a circuit interface section, and an ATM cell(s) is transferred to a chosen output circuit via a shaper chosen from plural shapers which compose the shaper section at the time of a connection set-up and the circuit interface section, comprising:

a shaper/circuit control section which includes a shaper/circuit-related table wherein a shaper number indicating the shaper chosen from the plural shapers constituting the shaper section at the time of a connection set-up and a circuit number of the output circuit to which the ATM cell(s) is transferred from the chosen shaper are related to each other and stored, judges whether or not a shaper corresponding to an assigned circuit number is registered in the shaper/circuit-related table in response to the interrogation about the assigned circuit number from the outside, outputs the shaper number of the corresponding shaper in the case where it is registered in the table, and establishes a relationship of a shaper number with the inputted assigned circuit number in the case where it is not registered in the table; and a connection control section which interrogates the shaper/circuit control section about the assigned circuit number at the time of a connection set-up, chooses a shaper corresponding to the shaper number from the shaper section in the case where the shaper number is inputted from the shaper/circuit control section in response to the interrogation, registers a shaper number corresponding to the assigned circuit number in the shaper/circuit-related table in the case where the shaper number is not inputted from the shaper/circuit control section, and sets up a connection between the chosen shaper and the circuit of assigned circuit number to the output circuit module section.

According to the present invention, in an ATM switch which includes a shaper section for cell traffic shaping in an output circuit module section, it is possible to choose a shaper at each time of a connection set-up by registering a correspondence between a shaper and a circuit in the shaper/circuit-related table at the time of a connection set-up.

According to the present invention, for achieving the object described above, there is provided an ATM switch comprising:

a shaper/circuit control section which includes a shaper/circuit/VP-related table wherein a shaper number indicating the shaper chosen from the plural shapers constituting the shaper section at the time of a connection set-up and a circuit number of the output circuit to which an ATM cell(s) is transferred from the chosen shaper are related to each other and stored, judges whether or not a shaper corresponding to an assigned circuit number and an assigned VP number is registered in the shaper/circuit/VP-related table in response to the interrogation about the assigned circuit number and the assigned VP number from the outside, outputs the shaper number of the corresponding shaper in the case where it is registered in the table, and establishes a relationship of a shaper number with the inputted assigned circuit number and the assigned VP number in the case where it is not registered in the table; and a connection control section which interrogates the shaper/circuit control section about the assigned circuit number and the assigned VP number at the time of a connection set-up, chooses a shaper corresponding to the shaper number from the shaper section in the case where the shaper number is inputted from the shaper/circuit control section in response to the interrogation, registers a shaper number corresponding to the assigned circuit number and the assigned VP number in the shaper/circuit/VP-related table in the case where the shaper number is not inputted from the shaper/circuit control section, and sets up a connection using an optional virtual path between the chosen shaper and the circuit of the assigned circuit number to the output circuit module section.

According to the present invention, in an ATM switch which having a shaper section for cell traffic shaping in an output circuit module section, it is possible to choose a shaper for each circuit and VP at each time of a connection set-up by registering a correspondence between a shaper and a circuit in a shaper/circuit/VP-related table at the time of a connection set-up.

In the shaper/circuit/VP-related table described above, it is also possible that not only plural VP numbers correspond to one circuit, but also units of plural VP numbers correspond to any one of plural circuits.

According to the present invention, for achieving the object mentioned above, there is provided a method for controlling traffic shapers in an ATM switch comprising steps of:

judging whether or not a shaper number of a shaper corresponding to an assigned circuit number is registered in a shaper/circuit-related table at the time of a connection set-up, as a first step;

choosing a shaper of the corresponding shaper number in the case where it is judged that the shaper number corresponding to the assigned circuit number is registered at the first step, as a second step;

registering the assigned circuit number and a shaper number in the shaper/circuit-related table in the case where it is judged that a shaper number corresponding to the assigned circuit number is not registered at the first step, as a third step;

establishing a relationship between the circuit and the shaper, which correspond to the assigned circuit number and the shaper number registered at the third step respectively, to the shaper section and the circuit interface section, as a fourth step; and setting up a connection using the shaper of the shaper number corresponding to the circuit of the assigned circuit number to the shaper section and the circuit interface section after the operation of the second step or the fourth step, as a fifth step.

Further, it is also possible to employ a shaper/circuit/VP-related table instead of the shaper/circuit-related table in the above-mentioned method for controlling traffic shapers. In this case, it is judged whether or not a shaper number(s) of a shaper(s) corresponding to an assigned circuit number and an assigned VP number(s) is(are) registered in a shaper/circuit/VP-related table at the time of a connection set-up. According to the judgment, a connection between a circuit and a shaper(s), the number of which correspond each other, is set up using a Virtual Path(s) of an assigned VP number(s) to a shaper section and a circuit interface section.

According to each invention described above, in an ATM switch which having a shaper section for cell traffic shaping in an output circuit module section, it is possible to choose required shapers for each circuit unit(s) and VP unit(s) at each time of a connection set-up by registering a correspondence between a shaper and a circuit in the shaper/circuit/VP-related table at the time of a connection set-up.

BRIEF DESCRIPTION OF THE DRAWINGS

The objects and features of the present invention will become more apparent from the consideration of the following detailed description taken in conjunction with the accompanying drawings in which:

FIG. 2 is a diagram explaining structure of the output circuit module section shown in FIG. 1;

FIG. 4 is a flowchart explaining the concrete operation of a connection set-up shown in FIG. 1;

FIG. 7 is a diagram explaining a connection set-up according to another embodiment of the present invention;

FIG. 8 is a diagram explaining a connection set-up according to further embodiment of the present invention.

DESCRIPTION OF THE PREFERRED EMBODIMENTS

Figure 1:
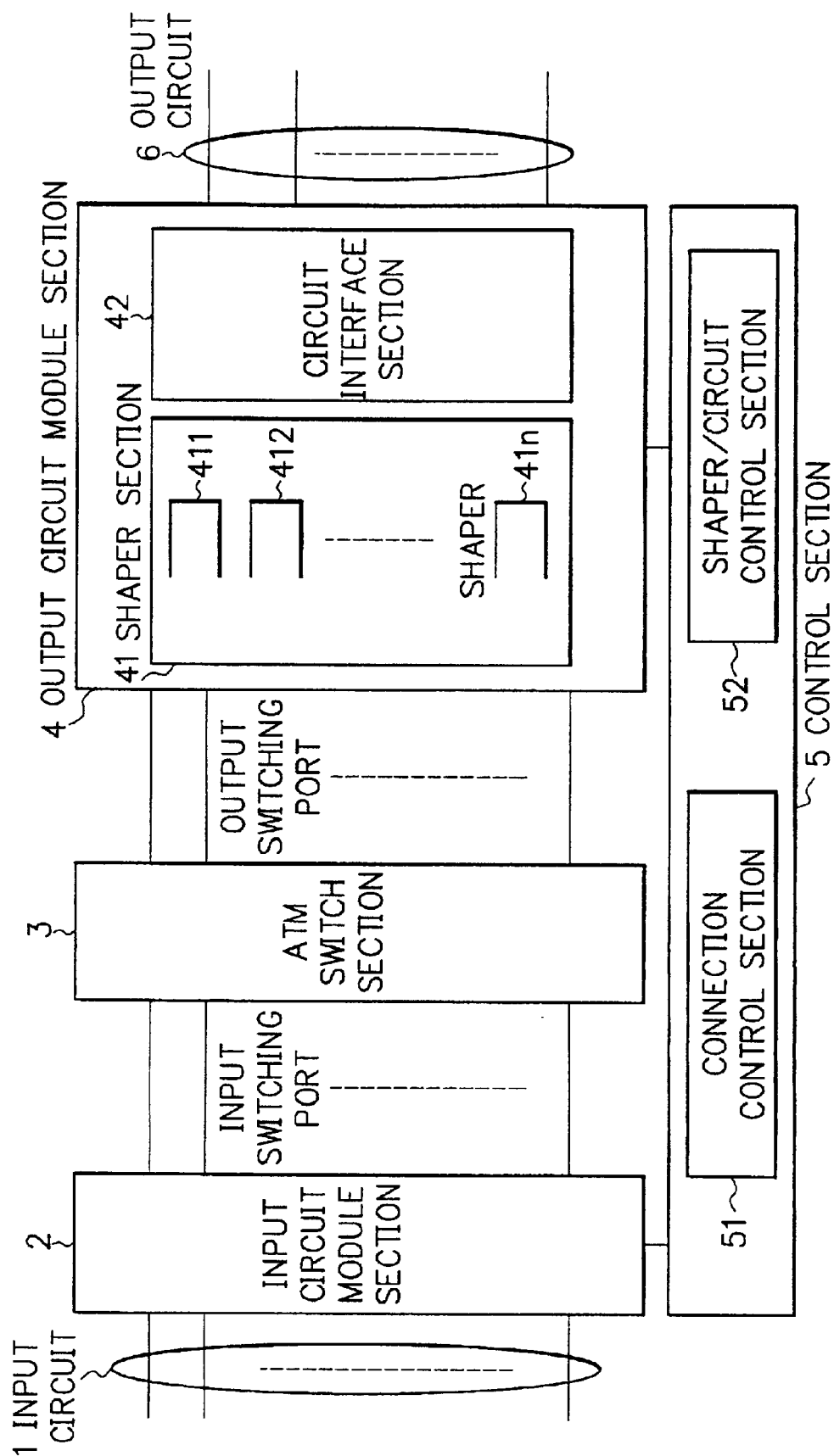
FIG. 1 is a block diagram showing an ATM switch according to an embodiment of the present invention.

Referring now to the drawings, embodiments of the present invention are explained in detail. FIG. 1 is a block diagram showing an ATM switch according to an embodiment of the present invention. As shown in FIG. 1, the ATM switch according to this embodiment comprises an input circuit module section 2 which is connected to input circuits 1, an ATM switch section 3 where a switching of an ATM cell(s) is executed, an output circuit module section 4 which is connected to output circuits 6, and a control section 5 for controlling the input circuit module section 2 and the output circuit module section 4.

Plural switching ports are accommodated in the ATM switch section 3, and plural input circuits 1 are accommodated in the input circuit module section 2. Plural output circuits 6 are accommodated in the output circuit module section 4 which comprises a shaper section 41 and a circuit interface section 42. The shaper section 41 has plural shapers 411-41n. These shapers 411-41n are normally constituted by buffers. The control section 5 is constituted by a connection control section 51 and a shaper/control section 52.

An ATM cell(s) is switched and transferred from the input circuit 1 to the output circuit 6 through a connection path set up to the ATM switch. At the input circuit module section 2, the ATM cell(s) from one of the input circuits 1 is transferred to an input switching port. At the ATM switch section 3, the ATM cell(s) from the input switching port is switched and transferred to an output switching port of the set connection path.

At the output circuit module section 4, the ATM cell(s) from the output switching port is transferred to the corresponding output circuit through one of the shapers which is chosen at the time of a connection set-up at the shaper section 41. At this time, it will be impossible to reproduce the ATM cell(s) faithfully if a delay variation exceeds an allowable range. In order to prevent this trouble, a shaping operation to absorb the delay variation is executed by outputting the stored ATM cell(s) at regular intervals after storing the inputted ATM cell(s) and delaying the ATM cell(s) over a maximum value of the cell delay variation.

The connection control section 51 controls connection information, and executes a connection set-up and its shut down to the input circuit module section 2 and output circuit module section 4. The shaper/circuit control section 52 controls a shaper/circuit-related table, and registers, modifies, and deletes the correspondence between the shaper and the circuit to the shaper section 41 and the circuit interface section 42.

FIG. 2 is a diagram showing structure of a principle part of the output circuit module section 4 as an example according to an embodiment of the present invention. The shaper section 41 has two shapers, a shaper 411 and a shaper 412, and the circuit interface section 42 has four circuits on the output side (output circuits) 61–64 (1–4). The shaper 411 or the shaper 412 is chosen at the time of a connection set-up and shaping is executed to traffic of an ATM cell(s) after the chosen shaper is related to an output circuit. In an initial condition, the correspondence between any one of the shaper 411-41n and any one of the circuits is not set up.

The connection control section 51 interrogates the shaper/circuit control section 52 about a corresponding relationship between a shaper and a circuit at the time of a connection set-up. If the relationship between them is new, the connection control section 51 sets up a corresponding relationship between the shaper section 41 and the circuit interface section 42 and chooses the corresponding shaper after registering the new relationship between the shaper and the circuit in a shaper/circuit-related table in the shaper/circuit control section 52. Accordingly control of traffic shapers in which a shaper can be chosen at each time of the connections set-up is executed.

Figure 3:
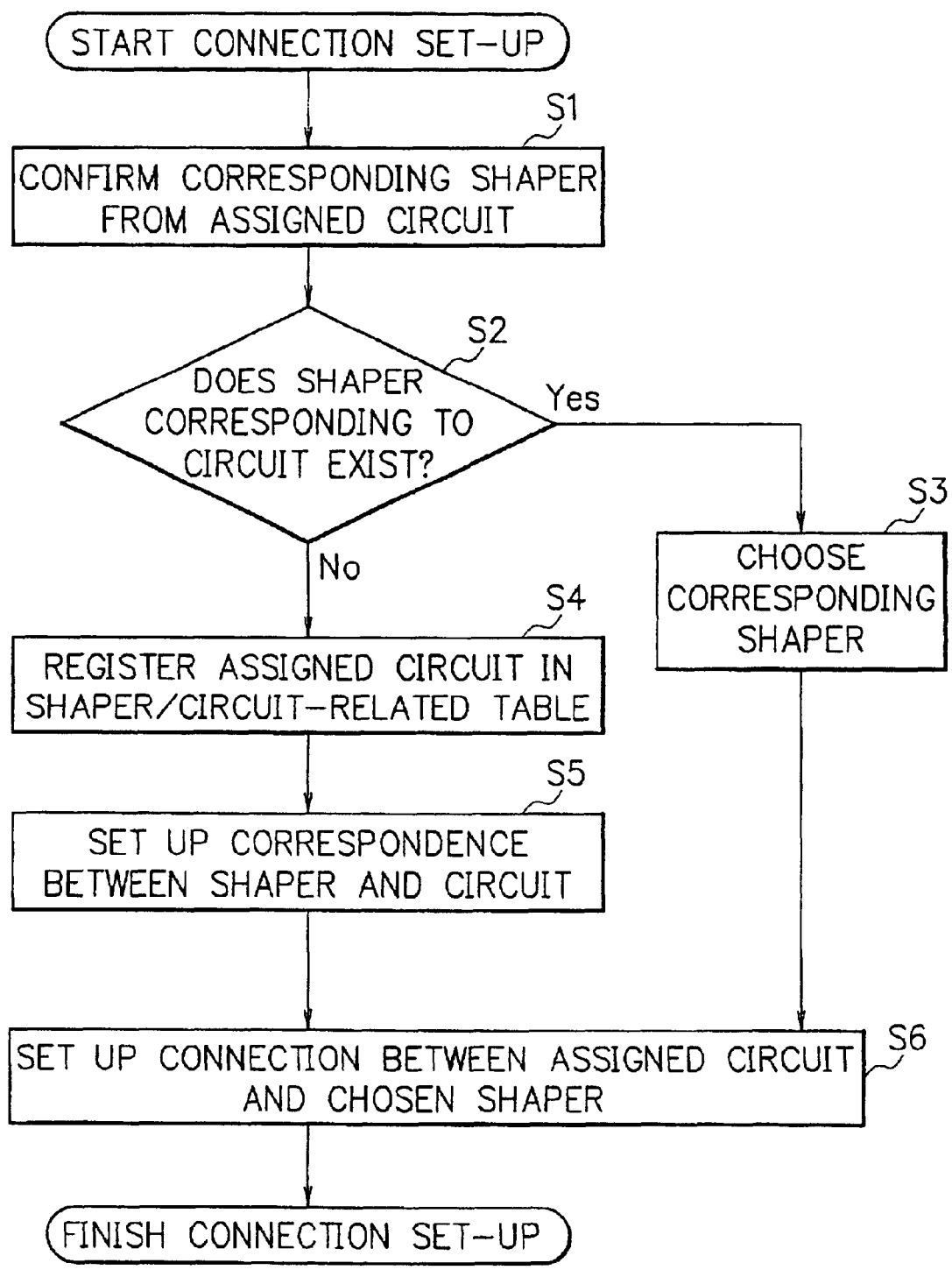
FIG. 3 is a flowchart explaining the operation of a connection set-up shown in FIG. 1.

Next, here is an explanation of an operation according to an embodiment of the present invention referring to a flowchart of FIG. 3. First, at the beginning of a connection set-up, the connection control section 51 in the control section 5 interrogates the shaper/circuit control section 52 using an assigned circuit number in order to confirm whether a shaper corresponding to an assigned circuit for a connection set-up exists or not (Step S1 in FIG. 3). Second, it is judged whether or not a shaper corresponding to the assigned circuit number interrogated from the connection control section 51 is registered in a shaper/circuit-related table at the shaper/circuit control section 52 in the control section 5 (Step S2 in FIG. 3).

In the case where a shaper corresponding to the interrogated assigned circuit number is registered, the corresponding shaper number is returned to the connection control section 51. A shaper is chosen according to the corresponding shaper number at the connection control section 51 (Step S3 in FIG. 3). On the other hand, in the case where a shaper corresponding to the interrogated assigned circuit number is not registered, the assigned circuit number and a shaper number are registered in the shaper/circuit-related table by the shaper/circuit control section 52 (Step S4 in FIG. 3).

Besides, a correspondence between the assigned circuit and the shaper is set up by the shaper/circuit control section 52 to the shaper section 41 and the circuit interface section 42 (Step S5 in FIG. 3). After the operation of the Step S3 or the Step S5 described above has finished, a connection is finally set up by using the assigned circuit and the chosen shaper by the connection control section 51 to the shaper section 41 and to the circuit interface section 42 (Step S6 in FIG. 3).

Next, here is a concrete explanation of the operation of the connection set-up described above using a flowchart of FIG. 4 and FIG. 5, Table 1 and Table 2. The same reference numerals denote the same part of the structure in FIG. 5 as in FIG. 2, and their explanations are abbreviated. First, the connection control section 51 in the control section 5 interrogates the shaper/circuit control section 52 using an assigned circuit number at the beginning of a connection set-up in order to confirm whether or not a shaper corresponding to the assigned circuit number for a connection set-up exists (Step S11 in FIG. 4).

Second, it is judged whether or not a shaper corresponding to the assigned circuit number interrogated from the connection control section 51 is registered referring to a shaper/circuit-related table by the shaper/circuit control section 52 in the control section 5 (Step S12 in FIG. 4). Here, it is assumed that a shaper number 1 and a circuit number 1 are registered in the shaper/circuit-related table as shown in Table 1.

TABLE 1

| shaper number | circuit number |
| --- | --- |
| 1 | 1 |

If the interrogated assigned circuit number described above is 1, the corresponding shaper number 1 is returned to the connection control section 51 because the corresponding shaper is registered in the shaper/circuit-related table. At the connection control section 51, a shaper 411 corresponding to the shaper number 1 is chosen (Step S13 in FIG. 4). On the other hand, if the interrogated assigned circuit number is 3, a shaper number 2 corresponding to the assigned circuit number 3 is registered in the shaper/circuit-related table by the shaper/circuit control section 52 because a shaper number corresponding to the interrogated assigned circuit number is not registered in the shaper/circuit-related table as shown in Table 1 (Step S14 in FIG. 4). According to these steps, the shaper/circuit-related table is renewed as shown in a Table 2.

TABLE 2

| shaper number | circuit number |
| --- | --- |
| 1 | 1 |
| 2 | 3 |

Figure 5:
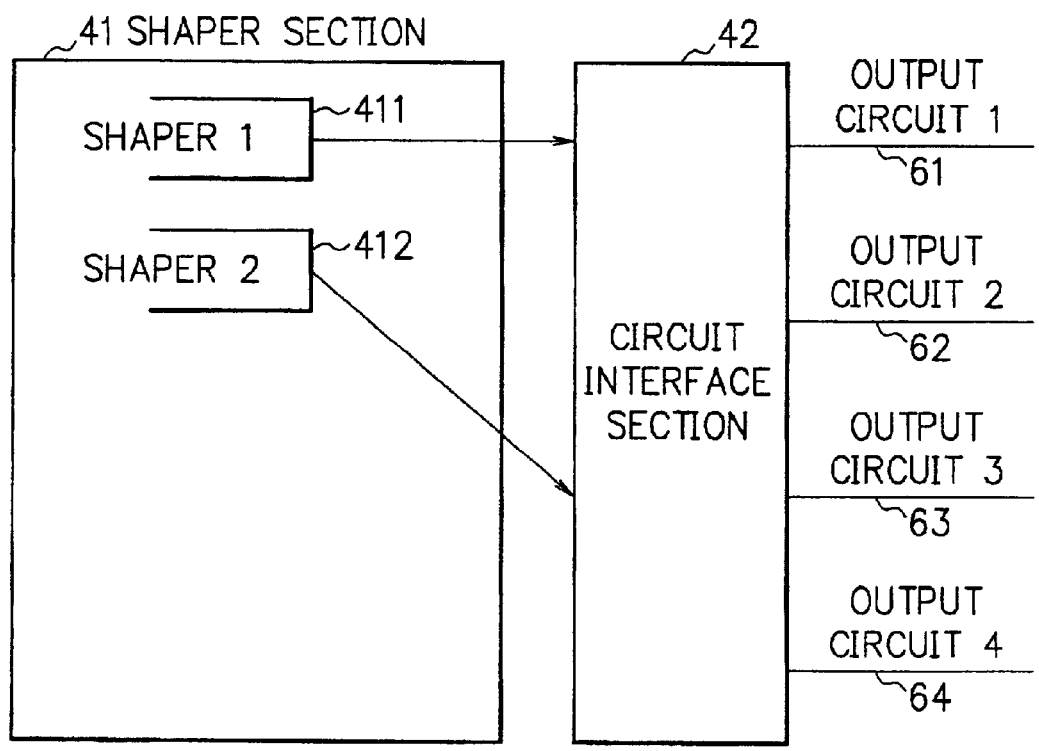
FIG. 5 is a diagram explaining the connection set-up in FIG. 4.

Besides, a correspondence is set up between the assigned circuit 3 (output circuit 63) and the corresponding shaper 412 of the shaper number 2 by the shaper/circuit control section 52 to the shaper section 41 and the circuit interface section 42 (Step S15 in FIG. 4). After the operation of the step S13 or the step S15, a connection is finally set up by using the assigned circuit and the chosen shaper by the connection control section 51 to the shaper section 41 and the circuit interface section 42 (Step 16 in FIG. 4). According these operations, each connection between the shaper section 41 and the output circuits is set up through the circuit interface section 42 as shown in FIG. 5.

As described hereinabove, according to this embodiment of the present invention, a shaper is chosen at the time of a connection set-up, so that it is possible to prepare shapers of the number, that is, a number of shaper units required, corresponding to connections. Besides, since each relationship between the shaper and the output circuit is not preliminarily fixed, but established as required for each connection set-up, it is possible to reduce the number of shapers.

Figure 6:
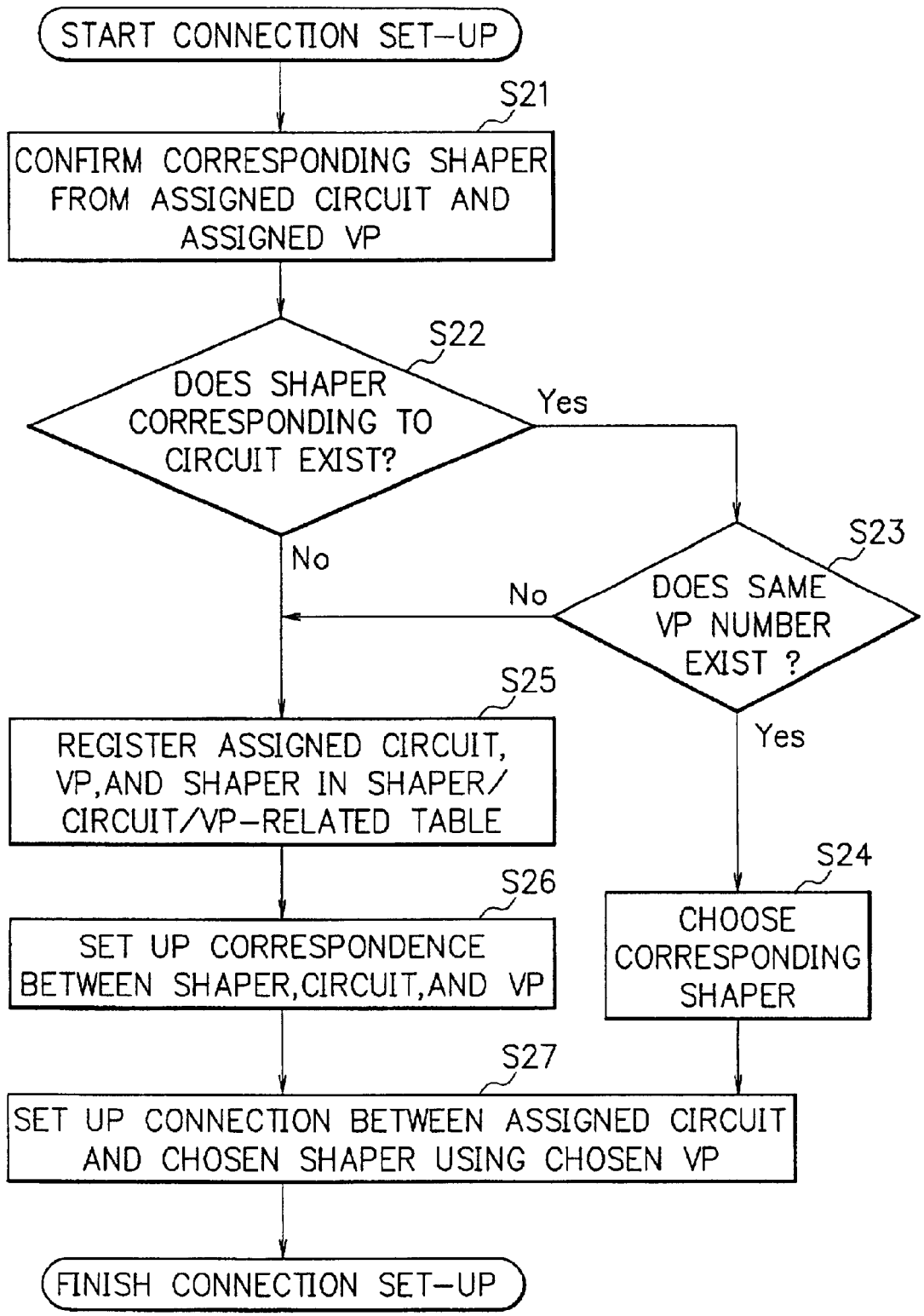
FIG. 6 is a flowchart explaining the operation of a connection set-up according to another embodiment of the present invention.

Next, here is an explanation of another embodiment of the present invention. FIG. 6 is a flowchart showing another embodiment of a method for controlling traffic shapers according to the present invention. In this embodiment, plural shapers of VP units correspond to one circuit.

First, at the beginning of a connection set-up, the connection control section 51 in the control section 5 interrogates the shaper/circuit control section 52 using an assigned circuit number and assigned VP numbers in order to confirm whether shapers corresponding to the assigned circuit and the assigned VPs for a connection set-up exist or not (Step S21 in FIG. 6). Second, it is judged whether or not shapers corresponding to the assigned circuit number interrogated from the connection control section 51 is registered in the shaper/circuit/VP-related table by the shaper/circuit control section 52 in the control section 5 (Step S22 in FIG. 6).

In the case where shapers corresponding to the interrogated assigned circuit number are registered in the table, it is judged whether or not any one of VP numbers corresponding to each of the registered shapers is the same as each of the interrogated assigned VP numbers (Step S23 in FIG. 6). In the case where the same VP numbers as each of the assigned VP numbers exist, the shaper numbers and the VP numbers are returned to the connection control section 51. At the connection control section 51, the corresponding shapers of the shaper numbers are chosen (Step S24 in FIG. 6).

On the other hand, in the case where shapers corresponding to the interrogated assigned circuit number are not registered or where any one of VP numbers corresponding to each of the registered shapers is different from the interrogated VP numbers even if the shapers are registered, an assigned circuit number, shaper numbers, and VP numbers are related each other and are registered in the shaper/circuit/VP-related table by the shaper/circuit control section 52 (Step S25 in FIG. 6).

Besides, a correspondence between the assigned circuit, assigned VPs, and the shapers is set up by the shaper/circuit control section 52 to the shaper section 41 and the circuit interface section 42 (Step S26 in FIG. 6). After the operations of the Step S24 or the Step S26 described above, a connection between the assigned circuit and the chosen shapers is finally set up using the chosen VPs by the connection control section 51 to the shaper section 41 and the circuit interface section 42 (Step S27 in FIG. 6).

Now, in the case where the shaper/circuit/VP-related table described above is the one as shown in Table 3, a connection between the shaper section 41 and one of the output circuits is set up through the circuit interface section 42 as shown in FIG. 7.

TABLE 3

| shaper number | circuit number | VP number |
|---|---|---|
| 1 | 1 | 1 |
| 2 | 1 | 2 |

Also, according to the further embodiment of the present invention, plural shapers of VP units correspond to any one of plural circuits. According to the same way explained using FIG. 6, in the case where the shaper/circuit/VP-related table is set up as shown in Table 4, each connection between the shaper section 41 and the circuits is set up through the circuit interface section 42 as shown in FIG. 8.

TABLE 4

| shaper number | circuit number | VP number |
|---|---|---|
| 1 | 1 | 1 |
| 2 | 1 | 2 |
| 3 | 3 | 3 |
| 4 | 3 | 4 |
| 5 | 3 | 5 |

As set forth hereinabove in the ATM switch according to the present invention which has the shaper section for cell traffic shaping in the output circuit module section, since a corresponding relationship between a shaper and a circuit is established at the time of connection set-up and a corresponding shaper is chosen at each time of the connections set-up, it is possible to prepare shapers corresponding to connections as required, and also to prepare plural shapers as required to one circuit.

Besides, according to the present invention, since a corresponding relationship between a shaper(s) and a circuit(s) is registered in the shaper/circuit-related table or the shaper/circuit/VP-related table at the time of a connection set-up, and just necessary shapers can be chosen for each circuit unit(s) or VP unit(s) without fixing the correspondence of a shaper(s) at each time of the connections set-up, it is possible to reduce the number of shapers.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An ATM switch wherein plural output circuits are accommodated in an output circuit module section which includes a shaper section and a circuit interface section, and an ATM cell(s) is transferred to a chosen output circuit via a shaper chosen from plural shapers which compose the shaper section at the time of a connection set-up and the circuit interface section, comprising:

a shaper/circuit control section which includes a shaper/circuit-related table wherein a shaper number indicating the shaper chosen from the plural shapers constituting the shaper section at the time of a connection set-up and a circuit number of the output circuit to which the ATM cell(s) is transferred from the chosen shaper are related to each other and stored, judges whether or not a shaper corresponding to an assigned circuit number is registered in the shaper/circuit-related table in response to an interrogation about the assigned circuit number from the outside, outputs the shaper number of the corresponding shaper in the case where it is registered in the table, and establishes a relationship of a shaper number with the inputted assigned circuit number in the case where it is not registered in the table; and a connection control section which interrogates the shaper/circuit control section about the assigned circuit number at the time of a connection set-up, chooses a shaper corresponding to the shaper number from the shaper section in the case where the shaper number is inputted from the shaper/circuit control section in response to the interrogation, registers a shaper number corresponding to the assigned circuit number in the shaper/circuit-related table in the case where the shaper number is not inputted from the shaper/circuit control section, and sets up a connection between the chosen shaper and the circuit of assigned circuit number to the output circuit module section.

2. An ATM switch wherein plural output circuits are accommodated in an output circuit module section which includes a shaper section and a circuit interface section, and in which an ATM cell(s) is transferred to a chosen output circuit via a shaper chosen from plural shapers which compose the shaper section at the time of a connection set-up and the circuit interface section, comprising:

a shaper/circuit control section which includes a shaper/circuit/VP-related table wherein a shaper number indicating the shaper chosen from plural shapers constituting the shaper section at the time of a connection set-up and a circuit number of the output circuit to which an ATM cell(s) is transferred from the chosen shaper are related to each other and stored, judges whether or not a shaper corresponding to an assigned circuit number and an assigned VP number is registered in the shaper/circuit/VP-related table in response to an interrogation about the assigned circuit number and the assigned VP number from the outside, outputs the shaper number of the corresponding shaper in the case where it is registered in the table, and establishes a relationship of a shaper number with the inputted assigned circuit number and the assigned VP number in the case where it is not registered in the table; and a connection control section which interrogates the shaper/circuit control section about the assigned circuit number and the assigned VP number at the time of a connection set-up, chooses a shaper corresponding to the shaper number from the shaper section in the case where the shaper number is inputted from the shaper/circuit control section in response to the interrogation, registers a shaper number corresponding to the assigned circuit number and the assigned VP number in the shaper/circuit/VP-related table in the case where the shaper number is not inputted from the shaper/circuit control section, and sets up a connection using an optional virtual path between the chosen shaper and the circuit of the assigned circuit number to the output circuit module section.

3. The ATM switch as claimed in claim 2, wherein plural VP numbers correspond to one circuit in the shaper/circuit/VP-related table.

4. The ATM switch as claimed in claim 2, wherein units of plural VP numbers correspond to any one of plural circuits in the shaper/circuit/VP-related table.

5. A method for controlling traffic shapers in an ATM switch wherein plural output circuits are accommodated in an output circuit module section which includes a shaper section and a circuit interface section, and in which an ATM cell(s) is transferred to a chosen output circuit via one of the shapers chosen from plural shapers which compose the shaper section at the time of a connection set-up and the circuit interface section, comprising steps of:

judging whether or not a shaper number of a shaper corresponding to an assigned circuit number is registered in a shaper/circuit-related table at the time of a connection set-up, as a first step;

choosing a shaper of the corresponding shaper number in the case where it is judged that the shaper number corresponding to the assigned circuit number is registered at the first step, as a second step;

registering the assigned circuit number and a shaper number in the shaper/circuit-related table in the case where it is judged that a shaper number corresponding to the assigned circuit number is not registered at the first step, as a third step;

establishing a relationship between the circuit and the shaper, which correspond to the assigned circuit number and the shaper number registered at the third step respectively, to the shaper section and the circuit interface section, as a fourth step; and setting up a connection using the shaper of the shaper number corresponding to the circuit of the assigned circuit number to the shaper section and the circuit interface section after the operation of the second step or the fourth step, as a fifth step.

6. A method for controlling traffic shapers in an ATM switch wherein plural output circuits are accommodated in an output circuit module section which includes a shaper section and a circuit interface section, and in which an ATM cell(s) is(are) transferred to a chosen output circuit via one of the shapers chosen from plural shapers which compose the shaper section at the time of a connection set-up and the circuit interface section, comprising steps of:

judging whether or not a shaper number(s) of a shaper(s) corresponding to an assigned circuit number and an assigned VP number(s) is(are) registered in a shaper/circuit/VP-related table at the time of a connection set-up, as a first step;

choosing a shaper(s) of the corresponding shaper number (s) in the case where it is judged that a shaper number (s) corresponding to the assigned circuit number and the assigned VP number(s) is registered according to the first step, as a second step;

registering the assigned circuit number, the assigned VP number(s), and shaper number(s) in the shaper/circuit/VP-related table in the case where it is judged that a shaper number(s) corresponding to the assigned circuit number and the assigned VP number(s) is not registered at the first step, as a third step;

establishing a relationship between the circuit and the shaper(s), which correspond to the assigned circuit number, the assigned VP number(s), and the shaper number(s) registered at the third step respectively, to the shaper section and the circuit interface section, as a fourth step; and setting up a connection using the shaper(s) of the shaper number(s) corresponding to the circuit of the assigned circuit number to the shaper section and the circuit interface section after the operation of the second step or the fourth step, as a fifth step.

* * * * *